(12) United States Patent
Vandike et al.

(10) Patent No.: US 11,206,763 B2
(45) Date of Patent: *Dec. 28, 2021

(54) WEED SEED BASED HARVESTER WORKING MEMBER CONTROL

(71) Applicant: Deere and Company, Moline, IL (US)

(72) Inventors: Nathan R. Vandike, Geneseo, IL (US); Bhanu Kiran Palla, Bettendorf, IA (US); Glenn E. Pope, Viola, IL (US); Ryan P. Mackin, Milan, IL (US); Bradley K. Yanke, Eldridge, IA (US); Mark M. Chaney, Geneseo, IL (US)

(73) Assignee: Deere & Company, Moline, IL (US)

( * ) Notice: Subject to any disclaimer, the term of this patent is extended or adjusted under 35 U.S.C. 154(b) by 319 days.

This patent is subject to a terminal disclaimer.

(21) Appl. No.: 16/380,623

(22) Filed: Apr. 10, 2019

(65) Prior Publication Data

US 2020/0128733 A1  Apr. 30, 2020

Related U.S. Application Data

(63) Continuation-in-part of application No. 16/175,993, filed on Oct. 31, 2018, now Pat. No. 10,986,778.

(51) Int. Cl.
| | | |
|---|---|---|
| *A01D 41/127* | (2006.01) | |
| *A01D 33/08* | (2006.01) | |
| *A01F 12/44* | (2006.01) | |
| *A01D 75/00* | (2006.01) | |

(52) U.S. Cl.
CPC ........... *A01D 41/127* (2013.01); *A01D 33/08* (2013.01); *A01D 75/00* (2013.01); *A01F 12/444* (2013.01); *A01F 12/448* (2013.01)

(58) Field of Classification Search
CPC ...... A01D 41/127; A01D 33/08; A01D 75/00; A01F 12/444; A01F 12/448; A01F 12/48; A01F 12/54; A01M 21/02
See application file for complete search history.

(56) References Cited

U.S. PATENT DOCUMENTS

| | | | |
|---|---|---|---|
| 3,580,257 A | 5/1971 | Teague | |
| 5,059,154 A * | 10/1991 | Reyenga | A01F 12/44 460/102 |
| 5,995,895 A * | 11/1999 | Watt | A01B 79/005 701/50 |
| 6,199,000 B1 * | 3/2001 | Keller | A01C 21/005 701/50 |

(Continued)

FOREIGN PATENT DOCUMENTS

| | | |
|---|---|---|
| CN | 203206739 | 9/2013 |
| DE | 2014201203 | 7/2015 |

(Continued)

OTHER PUBLICATIONS

European Search Report issued in counterpart European Application No. 20167930.5 dated Sep. 15, 2020 (06 pages).

*Primary Examiner* — Adam J Behrens
(74) *Attorney, Agent, or Firm* — Rathe Lindenbaum LLP (57) ABSTRACT

A harvester may include a crop path along which crops are moved, a working member to interact with weed seeds moving along the crop path and a controller. The controller is to receive data indicating forthcoming weed seeds and is to output control signals controlling the working member based on the data.

20 Claims, 3 Drawing Sheets

(56) References Cited

U.S. PATENT DOCUMENTS

| | | | | |
|---|---|---|---|---|
| 7,337,023 B2* | 2/2008 | Diekhans | ............. | A01D 41/127 700/52 |
| 8,152,610 B2* | 4/2012 | Harrington | ........... | B02C 13/288 460/111 |
| 8,428,830 B2* | 4/2013 | Diekhans | ............. | A01D 41/127 701/50 |
| 8,909,389 B2* | 12/2014 | Meyer | ................. | A01D 75/185 701/2 |
| 9,723,790 B2* | 8/2017 | Berry | ..................... | A01F 12/00 |
| 9,872,433 B2* | 1/2018 | Acheson | ............ | A01D 41/127 |
| 9,928,584 B2 | 3/2018 | Jens et al. | | |
| 10,314,232 B2* | 6/2019 | Isaac | ........................ | B02C 19/22 |
| 10,426,086 B2* | 10/2019 | Van de Wege | ......... | A01F 12/40 |
| 10,485,178 B2* | 11/2019 | Mayerle | .................. | A01F 12/40 |
| 10,729,067 B2* | 8/2020 | Hammer | .................. | G01F 1/30 |
| 10,986,778 B2 | 4/2021 | Chaney | | |
| 2003/0187560 A1* | 10/2003 | Keller | ................. | A01C 21/005 701/50 |
| 2009/0074243 A1* | 3/2009 | Missotten | .......... | A01D 41/1277 382/100 |
| 2010/0121541 A1* | 5/2010 | Behnke | ............. | A01D 41/1277 701/50 |
| 2011/0059782 A1* | 3/2011 | Harrington | ........... | B02C 13/288 460/149 |
| 2013/0210505 A1* | 8/2013 | Bischoff | ............... | A01F 12/448 460/101 |
| 2014/0350802 A1* | 11/2014 | Biggerstaff | ............ | A01F 12/58 701/50 |
| 2016/0084813 A1 | 3/2016 | Anderson | | |
| 2017/0031365 A1 | 2/2017 | Sugumaran et al. | | |
| 2017/0034997 A1* | 2/2017 | Mayerle | ............. | A01D 41/1243 |
| 2017/0235471 A1* | 8/2017 | Scholer | ................... | G01F 1/666 715/772 |
| 2018/0000011 A1* | 1/2018 | Schleusner | ........... | G06T 7/0004 |
| 2018/0070534 A1* | 3/2018 | Mayerle | .................. | A01F 12/40 |
| 2018/0153084 A1 | 6/2018 | Calleija et al. | | |
| 2019/0261560 A1* | 8/2019 | Jelenkovic | ................ | B60R 1/00 |
| 2019/0364734 A1* | 12/2019 | Kriebel | .................. | A01B 79/02 |
| 2020/0128732 A1 | 4/2020 | Chaney | | |

FOREIGN PATENT DOCUMENTS

| | | |
|---|---|---|
| EP | 3384754 | 10/2018 |
| EP | 3586592 | 1/2020 |
| EP | 3586592 A2 | 1/2020 |
| EP | 3646699 A1 | 5/2020 |
| WO | 2017008161 A1 | 1/2017 |
| WO | 2018235486 A1 | 12/2018 |

* cited by examiner

WEED SEED BASED HARVESTER WORKING MEMBER CONTROL

CROSS-REFERENCE TO RELATED PATENT APPLICATIONS

The present continuation-in-part application claims priority under 35 USC § 120 from co-pending U.S. patent application Ser. No. 16/175,993 filed on Oct. 31, 2018 by Mark M. Chaney and entitled WORKING MEMBER CONTROL, the full disclosure of which is hereby incorporated by reference

BACKGROUND

Weeds reduce crop yield by competing for water, sunlight and nutrients. Attempts to control weeds include the application of chemicals or tillage. Both attempts may be expensive and harmful. During harvesting, weeds and weed seed are separated from the grain being harvested. The weed seed is often discharged behind the harvester where it may promulgate the next growing season.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example harvesters, weed seed control methods and working member controller instructions that automatically adapt or adjust the operation of a working member of a harvester to adjust to varying weed seed conditions. As a result, the harvester may better accommodate regions of a field having a high density or number of weeds and corresponding weed seeds. Conversely, crops are being harvested in regions of a field having a lower density or number of weeds or weed seeds, the working member may be adjusted to conserve energy and increased harvester throughput.

The example harvesters, weed seed control methods and working member controller instructions obtain data indicating forthcoming weed seeds. For purposes of disclosure, the term "forthcoming" with respect to weed seeds refers to weed seeds expected to reach the working member during current harvesting by the harvester. The forthcoming weed seeds may be those weed seeds predicted based upon weed growth or plant population prior to harvest or immediately in front of a harvester during harvest. The forthcoming weed seeds for which data is obtained may be for those weed seeds that are currently being conveyed by the harvester, such as weed seeds being conveyed by a header of the harvester, being conveyed through the harvester or separated from grain within the harvester. The data may be obtained from airborne sensors or sensors carried by the harvester. The data may be obtained from preharvest field maps or historical field maps indicating prior weed densities are populations, wherein geo-positioning data and such maps are used to identify weed seed data for crops currently being harvested or about to be harvested by a harvester.

The obtained data may reflect one of many parameters regarding weed seed. For example, the data may indicate the density of weeds, the estimated mass, number or volume of weed seeds, the rate at which weeds or weed seeds are forthcoming, the size, weight or density of the weed seeds and/or a type or types of weed seeds that are expected or forthcoming.

Based upon such data, an operational state of the working member is adjusted. For example, a working member may be actuated between an off state and an on state based upon the data. A working member may be actuated or adjusted from a first on state to a second on state different than the first on state. The weed seed may be directed to and through different screens based on the data. Different chemicals or radiation may be applied to the weed seeds based on the data. The weed seed may be differently impacted or differently propelled based upon the data. For example, based on such data, a controller may output control signals adjusting various working members of a harvester such as a blower that blows air through and across a chapter or sieve, a chopper that chops residue prior to his discharge and/or a discharge spreader that spreads straw and chaff from the rear of the harvester. In some implementations, other various settings may be adjusted such as settings of the rotors/straw walker for settings of the chaffer/sieve. Based upon the presence or density of weeds or weed seed, the determined type of weed or weed seed or the particular characteristics of the weed or weed seed. Such adjustments may further be varied depending upon the type of crop being harvested and/or the characteristics of the crop being co-harvested with the weed seeds, such as the current yield rate of the crop, the moisture content of the crop. Such adjustments may additionally be based upon other operational parameters of the harvester itself in combination with the data regarding the weeds or weed seeds such as pitch or role of the harvester, and/or the velocity of travel of the harvester.

Disclosed herein is an example harvester that may include a crop path along which crops are moved, a working member to interact with weed seeds moving along the crop path and a controller. The controller is configured to, has specific logic, programming or coded instructions to receive data indicating forthcoming weed seeds and to output control signals controlling the working member based on the data.

Disclosed is an example weed seed control method. The example weed seed control method involves receiving data indicating weed seeds prior to the weed seeds arriving at a working member that interacts with weed seeds moving along a crop path of the harvester. The method further comprises preemptively adjusting operation of the working member based upon the data.

Disclosed are example controller instructions, the controller instructions stored upon or provided by a non-transitory computer-readable medium. The instructions comprise instructions to direct a processing unit to obtain data indicating forthcoming weed seeds. The instructions further comprise instructions to direct the processing unit to output control signals to control operation of a working member, that interacts with weed seeds moving along a crop path of a harvester, based upon the obtained data.

Figure 1:
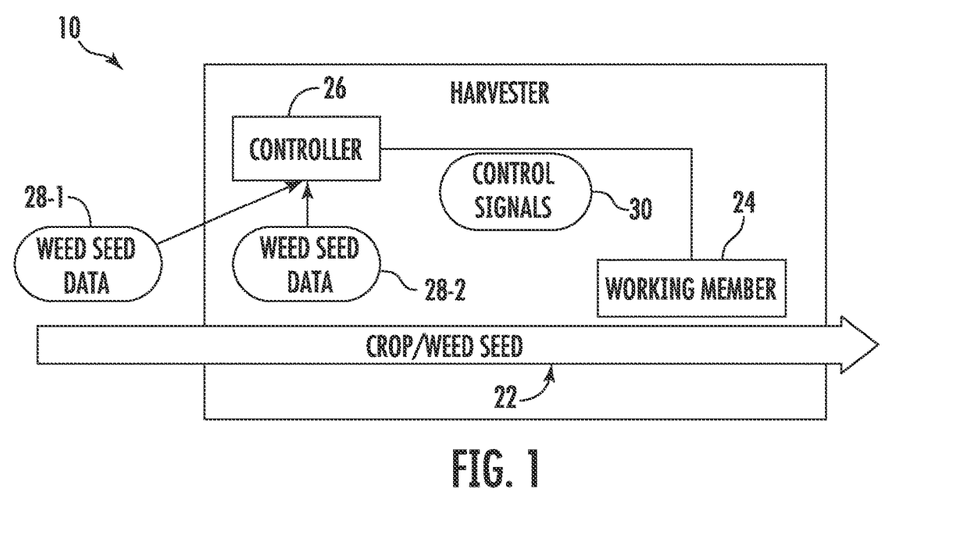
FIG. 1 is a block diagram schematically illustrating portions of an example harvester having an example weed seed control system.

FIG. 1 is a block diagram schematically illustrating portions of an example harvester 10. Harvester 10 comprises a mechanism that is to be propelled across, pulled across or otherwise moved across a field or other growing medium, wherein harvester 10 separates crops from the growing medium. One example of such a harvester is a combine harvester that carries out threshing of grain from remaining biomass of the crop. Such harvesters may gather and thresh crops such as corn, wheat, oats, barley and the like. In other implementations, harvester 10 may comprise other forms of harvesters for harvesting other types of crops.

In addition to the crops being harvested, the growing medium may support weed populations. Such weeds may be undesirably gathered by harvester 10 during harvesting of the targeted crops. During threshing of the crop, the weed seeds may also be threshed or separated from remaining biomass, such as stalks, leaves and the like. Although separated from the grain, such weed seeds may be discharged from the harvester as a harvester traverses a field or growing medium. As will be described hereafter, harvester 10 automatically adjusts the operational parameters of such a working member or multiple working members to accommodate changing weed conditions. As a result, the harvester 10 may better accommodate regions of a field having a high density or number of weeds and corresponding weed seeds. Conversely, when crops are being harvested in regions of a field having a lower density or number of weeds or weed seeds, the working member may be adjusted to conserve energy and increase harvester throughput. Harvester 10 comprises crop path 22, working member 24 and controller 26.

Crop path 22 comprises a path along which crops are moved by harvester 10 and during which various working members, including working member 24, interact with the crops. During the conveyance of such crops along crop path 22, weed seeds may also be carried or conveyed along crop path 22. The crop path 22 may extend from a front end of the harvester 10 to a rear end of the harvester 10. In one implementation, the crop path 22 begins at the front end of a header of harvester 10 where the crop and weed seeds are separated from the growing media such as during the severing of the stalk or stem supporting the crop or weed seed. The crop path 22 may extend to various separation and threshing stations, during which the crop and weed seed are further separated from remaining portions of the stock, stem, leaves, husk, cob or other portions of the plant. The crop path 22 may and at the point where portions of the crop or weed not gathered, collected or harvested are discharged from the harvester 10. In one implementation, crop path 22 may end at a discharge spreader which spreads the discharge as the discharge (chaff, weed seed, unharvested grain, straw and the like) are dispersed from harvester 10.

Working member 24 (schematically shown) comprises a device that interacts with the crop and/or commingled weeds and/or weed seed as they are moved along crop path 22. Such interaction may be direct contact or may be indirect interaction using air or other intermediate members. In one implementation, working member 24 may comprise a rotor, such as a coaxial rotor, or a straw walker that separates grain from straw or larger plant material, wherein the grain and smaller plant material such as chaff, weed seeds and the like may be filtered and passed to a further threshing chaffer are sieve. In one implementation, working member 24 comprises a chaffer or sieve having louvers through which the crop materials further filtered. In one implementation, working member 24 comprises a blower that directs air through and/or along a chafer or sieve, wherein the blown air carries lighter material away from the grain being harvested towards the discharge location of harvester 10. In one implementation, working member 24 may comprise a chopper that chops the straw are larger plant material exiting the rotor are straw walker prior to the larger plant material being discharged. In one implementation, working member 24 comprises a discharge spreader which spreads or disperses the discharge from the harvester 10. For example, the discharge spreader may comprise a rotationally driven group of blades that spread chaff, chop straw and weed seed from the harvester 10.

Controller 26 comprises an electronic device that received data 28-1, 28-2 indicating forthcoming weed seeds and that outputs control signals 30 controlling working member 24 based on the data. In one implementation, controller 26 comprises a processing unit and a non-transitory computer-readable medium that directs the processing unit to analyze the weed seed data pertaining to the forthcoming weed seeds and which automatically outputs control signals adjusting the operational parameters of working member 24.

As schematically shown in FIG. 1, the weed seed data received by controller 26 and analyzed by controller 26 to generate and output control signals 30 may be based upon weed seed data 28-1 sensed or acquired outside of harvester 10. For example, the forthcoming weed seeds 33 may be those weed seeds predicted based upon weed growth or plant population prior to harvest or immediately in front of a harvester during harvest. The data may be obtained from airborne sensors or sensors carried by the harvester. The data may be obtained from preharvest field maps or historical field maps indicating prior weed densities or populations, wherein geo positioning data (such as global positioning system data received from a satellite or other geo data indicating the current position of harvester 210 as a traverses a field) and weed seed data from such maps are used to identify weed seed data for crops currently being harvested at a particular moment in time or about to be harvested by a harvester.

As further schematically shown by FIG. 1, the weed seed data 28-2 received by controller 26 and analyzed by controller 26 to generate and output control signals 30 may be based upon weed seeds that are currently being conveyed by the harvester, such as weed seeds being conveyed by a header of the harvester, being conveyed through the harvester or separated from grain within the harvester.

The obtained data 28-1, 28-2 may reflect one of many parameters regarding weed seed. For example, the data may indicate the density of weeds outside of harvester 10, the density of weed seeds in the grain or crop being conveyed through harvester 10, the estimated mass, number or volume of weed seeds, the rate at which weeds or weed seeds are forthcoming, the size, weight or density of the weed seeds and/or a type or types of weed seeds that are expected or forthcoming.

Based upon such data, controller 26 outputs control signals 30 to adjust an operational state of the working member 24. Control signals may be output in response to a first set of weed seed data at a first moment in time while second different control signals may be output in response to a second set of weed seed data at a second point in time. For example, the control signals may actuate the working member 24 between an off state and an on state based upon the data. The control signals 30 may actuate or adjust the working member 24 from a first on state to a second on state different than the first on state. The control signals 30 may cause an actuator to adjust the positioning of one or more grain flow valve mechanisms, baffles of the like to direct the crop flow and its weed seed through different screens of the working member 24 based on the data.

The control signals 30 may adjust the operation of a motor or other actuator to just the force or rate at which the weed seeds are moved along crop path 22. For example, the control signals 30 may adjust operation of the coaxial rotor or straw walker, such as adjusting the spacing between the rotor and the greats and/or the rate at which the rotor is driven. In one mode of operation, the coaxial rotor are straw walker may be adjusted so as to be more likely to filter out the weed seeds along with the grain or capture given the characteristics, density or other properties of the weed seed, so as to reduce the amount of weed seed that is discharged to the field, wherein the weeds are to be subsequently filtered out at a later grain cleaning operation where the weeds he is not just charged to the field. Conversely, in another mode of operation, the operation of the coaxial rotor or straw walker may be adjusted so as to inhibit the passage of the weed seed through the filtering to the chaffer or sieve such that the weed seed is more likely to be conveyed rearward for discharge, reducing foreign material in the grain and enhancing grain quality.

In one implementation, the control signals 30 may adjust operation of the chaffer or sieve, such as adjusting the spacing of the louvers of the chaffer or sieve or the rate at which the louvers are reciprocated. In one mode of operation, the chaffer or sieve may be adjusted so as to be more likely to filter out the weed seeds along with the grain or capture given the characteristics, density or other properties of the weed seed, so as to reduce the amount of weed seed that is discharged to the field, wherein the weeds are to be subsequently filtered out at a later grain cleaning operation where the weeds he is not just charged to the field. Conversely, in another mode of operation, the operation of the chaffer or sieve may be adjusted so as to inhibit the passage of the weed seed through the filtering to the chaffer or sieve such that the weed seed is more likely to be conveyed rearward for discharge, reducing foreign material in the grain and enhancing grain quality.

In one implementation, the control signals 30 may adjust operation of the blower, such as adjusting the velocity of the blower and/or the position of one or more baffles associated with the blower that direct air from the blower. In one mode of operation, the blower (including any air directing baffles) may be adjusted so as to be less likely to blow the generally lighter weed seeds along with the grain or capture given the characteristics, density or other properties of the weed seed, so as to increase the amount of weed seed that is actually captured in harvest and reduce the amount of weed seed that is discharged to the field, wherein the weeds are to be subsequently filtered out at a later grain cleaning operation where the weeds he is not just charged to the field. Conversely, in another mode of operation, the operation of the blower may be adjusted such that the generated airflow is stronger or more direct so as to carry a greater amount of weed seed to the end of the crop path for discharge, reducing foreign material in the grain and enhancing grain quality.

In one implementation, the control signals 30 may adjust operation of the chopper, such as adjusting the velocity of the chopper and/or the degree to which the biomass or crop material is chopped. In one mode of operation, the chopper may be adjusted so as to more finely chop the biomass, increasing likelihood that the weed seed will be damaged. Conversely, in another mode of operation, the operation of the chopper may be adjusted such that the biomass including the weed seed is chopped to a lesser extent such that the weed seed will be discharged across a smaller area by a discharge spreader, reducing the extent of weed growth and subsequent growing seasons.

In one implementation, the control signals 30 may adjust operation of the discharge spreader, such as adjusting the velocity of the rotary actuator driving the discharge spreader and/or the degree to which the discharge spreader impacts the biomass. In one mode of operation, the operation of the discharge spreader may be adjusted so as to impact the weed seed at a greater velocity, increasing likelihood that the weed seed will be damaged. Conversely, in another mode of operation, the operation of the discharge spreader (its rotary actuator) may be adjusted such that the biomass including the weed seed is spread to a lesser extent such that the weed seed will be discharged across a smaller area by a discharge spreader, reducing the extent of weed growth and subsequent growing seasons.

In one implementation, control signals 30 may cause adjustments to multiple different working members, such as the multiple different possible working members described above. Because the operation of working member 24 is automatically and dynamically adjusted to varying weed seed conditions, working member 24 may reliably adjust to times of high weed seed flow. Conversely, when such weed seed data 28-1, 28-2 indicates low levels of weed seed flow, working member 24 24 may be turned off or turned down or otherwise adjusted to conserve energy and/or facilitate faster crop throughput.

Figure 2:
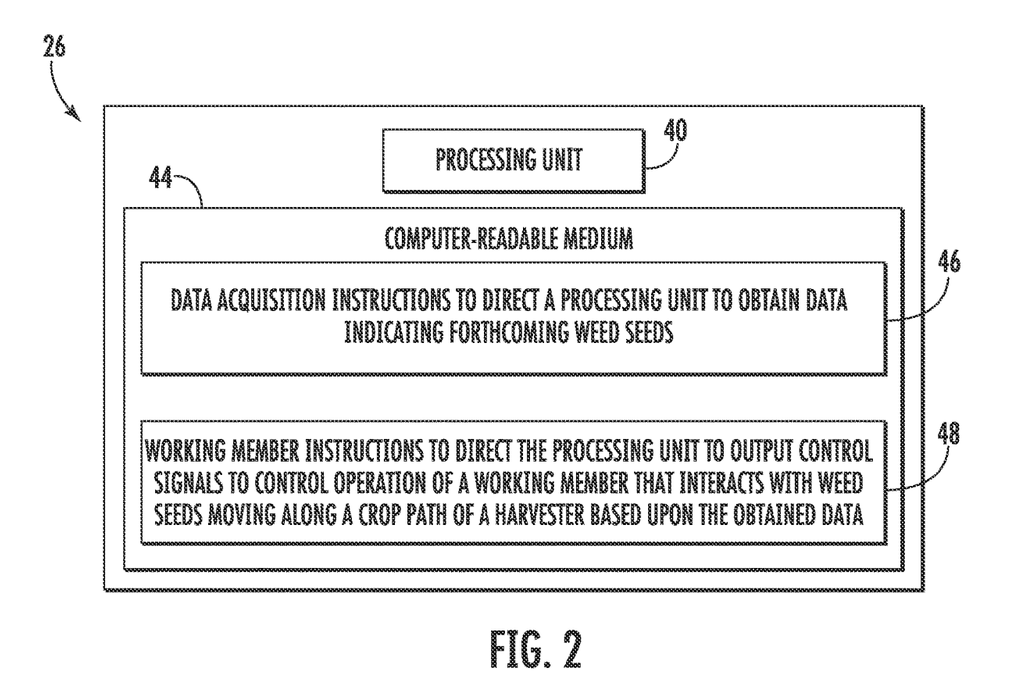
FIG. 2 is a block diagram schematically illustrating portions of an example controller of the harvester of FIG. 1.

FIG. 2 is a block diagram illustrating portions of an example controller 26. As shown by FIG. 2, controller 26 comprises processing unit 40 and non-transitory computer-readable medium 44. Medium 44 contains instructions for directing processing unit 40. Medium 44 comprises instructions 46 for directing processing unit 40 to obtain weed seed data 28-1, 29-2, data indicating forthcoming weed seeds. In one implementation, the data may be obtained by retrieving and reading a historical weed or weed seed map. The weed or weed seed map may indicate historical weed densities or weed seed production in particular regions of a field from prior growing seasons or from the current growing season prior to harvest. Using the map and Geo data pertaining to the current location of the harvester in the field, processing unit 40 may determine or estimate forthcoming weed or weed seed characteristics such as the density of weeds outside of harvester 10, the estimated mass, number or volume of weed seeds, the rate at which weeds or weed seeds are forthcoming, the size, weight or density of the weed seeds and/or a type or types of weed seeds that are expected or forthcoming.

In another implementation, controller 26 may alternatively or additionally acquire weed seed data 28-1 from sensors that sense regions adjacent harvester 10 during harvesting. For example, such data may be obtained from airborne sensors such as drones or satellites. Such data may be tamed from forwardly supported sensors carried by harvester 10 that detect weeds or weed seeds in front of or otherwise adjacent harvester 10. In some implementations, controller 26 may alternatively or additionally acquire weed seed data 28-2 regarding separated weeds or weed seeds currently moving within and through harvester 10. For example, controller 26 may include infrared sensors, optical sensors, filtering sensors or the like that interact with weed seeds flowing through harvester 10 to obtain or acquire such weed or weed seed information.

As further shown by FIG. 2, medium 44 further comprises instructions 48 to direct a processing unit to output control signals to control operation of a working member, such as working member 24, based upon the obtained data. In one implementation, instructions 48 may direct processing unit 40 to compare a weed seed data parameter to a predefined threshold, wherein satisfaction of the threshold automatically causes the processing unit 40 to output control signal adjusting the operational state of working member 24.

In one implementation, the weed seed data may comprise multiple different parameters or factors, wherein the instructions 48 direct processing unit 40 to compare each of the different parameters or factors to different thresholds and wherein the comparison may trigger the automatic output of control signals that adjust operation of the working member 24. In one implementation, different weed seed parameters may have different weightings or weights depending upon the ascribed importance of such factors in the overall adjustment of working member 24.

For example, the adjustment of working member 24 by controller 26 may be based upon weed seed data comprising the type of weed seed and the rate at which the weed seed is passing through harvester 10. Different types of weed seed and different weed seed flow rates may trigger different operational states for working member 24. For example, a first type of weed seed from a first type of weed may trigger a first operational state of working member 24 while a second different type of weed or weed seed may trigger a second different operational state of working member 24. A first flow rate of weed seed may trigger a first operational state of working member 24 while a second different flow rate of weed seed may trigger a second different operational state of working member 24. The selected operational state may, in some implementations, the based upon a combined aggregate score derived from both factors taken together, wherein different operational states of working member 24 are triggered automatically in response to different scores. In some implementations, the relative contribution of the two factors to the score may depend upon different weights assigned to each of the factors. In other implementations, the automatic triggering of different states for working member 24 may be based upon more than two weed or weed seed parameters or factors.

In one implementation, instructions 48 may direct processing unit 40 to compare such weed seed data against different candidate operational states for working member 24 contained in a lookup table. In yet other implementations, instructions 48 may direct processing unit 40 to utilize different values for the weed seed data in a formula or calculation, wherein the result of the calculation is compared against a threshold or corresponded to a particular setting in a lookup table to determine what control signals 30 should be output to working member 24.

Instructions 48 may direct processing unit 40 to output control signals, based upon the weed seed data, to actuate the working member 24 between an off state and an on state based upon the data. The control signals 30 may actuate or adjust the working member 24 from a first on state to a second on state different than the first on state. The instructions 48 may direct processing unit 40 to output control signals that cause an actuator to adjust the positioning of one or more grain flow valve mechanisms, baffles of the like to direct the crop flow and its weed seed through different screens of the working member 24 based on the data.

In some implementations, the instructions 48 may cause a processing unit 40 to output control signals that adjust the operation of a motor or other actuator (1) to adjust the spacing of various screening weed seed filtering members along the crop path, such as louvers in a chapter or sieve, (2) to adjust the threshing of the harvested material such as an adjustment of the coaxial rotor or straw walker, (3) to adjust the rate at which harvested material, including each of biomass material, grain and weed seed, is conveyed or moved along the crop path, such through the adjustment of a blower, (4) to adjust the degree to which harvested material or biomass material, possibly including weed seed, is chopped prior to discharge and/or (5) to adjust the discharge of biomass material, possibly including weed seed, from the harvester. Because the operation of working member 24 is automatically and dynamically adjusted to varying weed seed conditions, working member 24 may accommodate different weed seed conditions. Conversely, when such weed seed data 28-1, 28-2 indicates low levels of weed seed flow, the instructions 48 may direct a processing unit 40 to output control signals turning off or slowing working member 24 to conserve energy and facilitate faster crop throughput.

Figure 3:
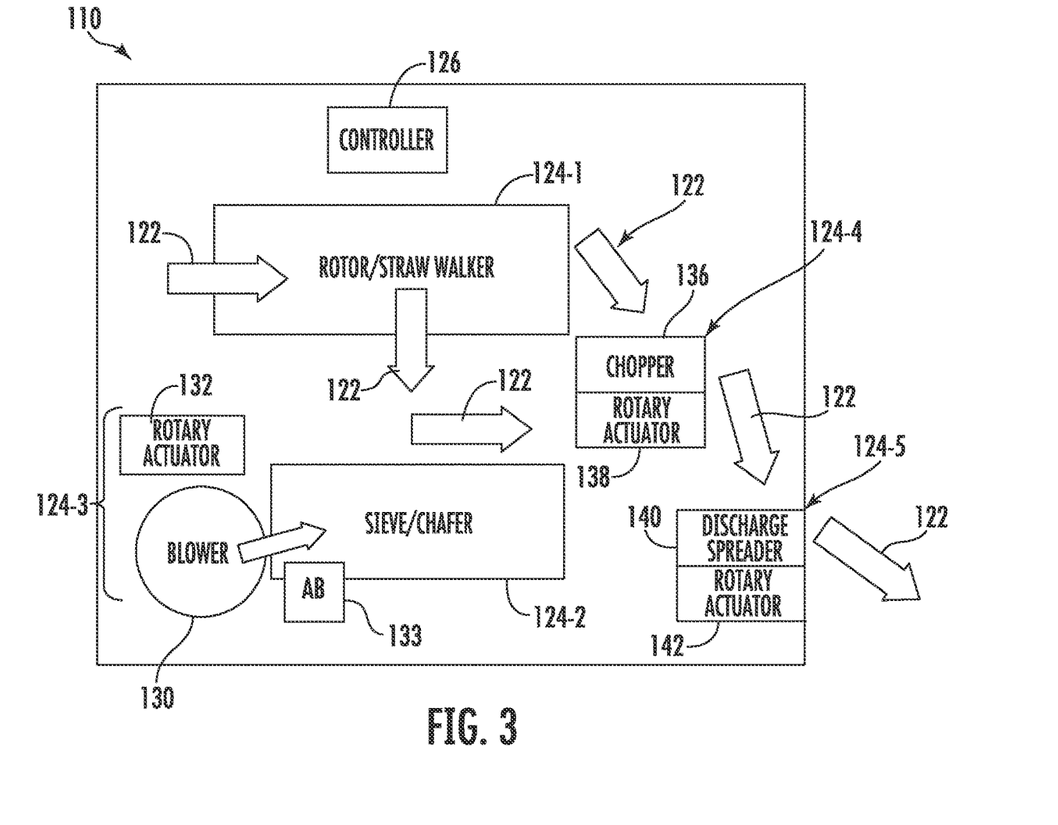
FIG. 3 is a diagram schematically illustrating portions of an example weed seed control system.

FIG. 3 is a diagram illustrating portions of an example harvester 110. Harvester 110 comprises a crop path 122 indicated by the large arrows, working members 124-1, 124-2, 124-3, 124-4 and 124-5 (collectively referred to as working members 124) and controller 126. Crop path 122 is a path along which harvested material including grain, biomass material and weed seeds travel following initial separation from the growing medium and during threshing of the harvested material by harvester 110. The crop path may begin at a header or other point at which the harvested material is separated from the growing medium. The crop path may continue to where the crop material is interacted by working member 124-1 in the form of a rotor or straw walker. Smaller grain and weed seed as well as smaller harvested material may pass through the straw walker or grates associated with the rotor along path 122 towards working member 124-2 in the form of a sieve and/or chaffer. In one implementation or mode of operation, controller 126 may output control signals based upon weed seed data 28-1 and/or 28-2 (described above) that adjust the operation of working member 124-1, such as the spacing between the concave or grate and the rotor.

The harvested material that passes through the filtering of working member 124-1 is further filtered by working member 124-2. Based upon the weed seed data 28-1 and/or 28-2, controller 126 may output control signals adjusting the state or operation of working member 124-2. For example, the spacing of the louvers may be adjusted or the rate of reciprocation of the sieve or chafer may be adjusted based upon the weed seed data.

Working member 124-3 comprises a blower 130 driven by rotary actuator 132. Blower 130 generates airflow which is directed through and across the sieve or chafer of working member 124-2. Based upon weed seed data 28-1 and/or 28-2 as described above, controller 126 may output control signals to the rotary actuator 132, adjusting the rate at which blower 130 is driven by rotary actuator 132 or other actuators that adjust air directing baffles (AB, schematically shown) 133. The air driven through and across the louvers of a sieve/chafer of working member 124-2 lifts and carries lighter harvested material, such as chaff and weed seed, towards working member 124-5 in the form of a discharge spreader.

In one mode of operation, the blower 130 (including rotary actuator 132 and any air directing baffle 133) may be adjusted so as to be less likely to blow the generally lighter weed seeds along with the grain or capture given the characteristics, density or other properties of the weed seed, so as to increase the amount of weed seed that is actually captured in harvest and reduce the amount of weed seed that is discharged to the field, wherein the weeds are to be subsequently filtered out at a later grain cleaning operation where the weeds he is not just charged to the field. Conversely, in another mode of operation, the operation of the blower 130 may be adjusted such that the generated airflow is stronger or more direct so as to carry a greater amount of weed seed to the end of the crop path for discharge, reducing foreign material in the grain and enhancing grain quality.

Harvested material that does not pass through the concave or grate of working member 124-1 may further be directed to working member 124-4 in the form of a chopper 136 driven by rotary actuator 138. In one implementation, the controller 126 outputs control signals, based upon weed seed data 28-1 and/or 28-2 (as described above) to the rotary actuator 138 to adjust the velocity of the chopper and/or the degree to which the biomass or crop material is chopped. In one mode of operation, the chopper may be adjusted so as to more finely chop the biomass, increasing likelihood that the weed seed will be damaged. Conversely, in another mode of operation, the operation of the chopper may be adjusted such that the biomass including the weed seed is chopped to a lesser extent such that the weed seed will be discharged across a smaller area by a discharge spreader, reducing the extent of weed growth and subsequent growing seasons.

Harvested material which is not also been conveyed to a grain tank or other storage of harvester 110 is directed along crop path 122 to working member 124-5 in the form of a discharge spreader 140 that may be driven by rotary actuator 142. In one implementation, the control signals may adjust operation of the discharge spreader, such as adjusting the velocity of the rotary actuator driving the discharge spreader and/or the degree to which the discharge spreader impacts the biomass. In one mode of operation, the operation of the discharge spreader may be adjusted so as to impact the weed seed at a greater velocity, increasing likelihood that the weed seed will be damaged. Conversely, in another mode of operation, the operation of the discharge spreader (its rotary actuator 142) may be adjusted such that the biomass including the weed seed is spread to a lesser extent such that the weed seed will be discharged across a smaller area by a discharge spreader, reducing the extent of weed growth and subsequent growing seasons.

Figure 4:
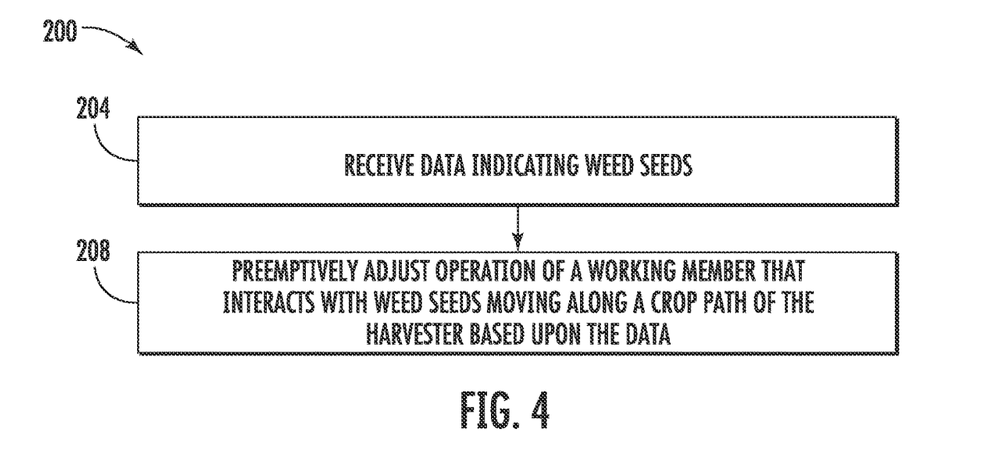
FIG. 4 is a flow diagram of an example weed seed control method.

FIG. 4 is a flow diagram of an example weed seed control method 200. Method 200 may be carried out by a controller of harvester 10, 110 or with a controller of other similar harvesters. As indicated by block 204, a controller, such as controller 26, receives data indicating weed seeds prior to the weed seeds arriving at a working member. As discussed above, the data may correspond to weeds still growing in a growing medium adjacent to a harvester, weeds after being severed from the growing medium but being conveyed by the harvester, such as along the header of the harvester or from weed material or direct weed seed detection during conveyance within the harvester. As discussed above, the weed seed data may comprise a single parameter or may comprise multiple different parameters such as the density of weeds outside of a harvester, the density of weed seeds in the grain or crop being conveyed through harvester 10, the estimated mass, number or volume of weed seeds, the rate at which weeds or weed seeds are forthcoming, the size, weight or density of the weed seeds and/or a type or types of weed seeds that are expected or forthcoming.

As indicated by block 208, based upon the data, the controller preemptively adjusts operation of working member, changes the operational state of the working member to accommodate changes in the flow of weed seeds. As discussed above, based upon such data, the controller may output first control signals in response to a first set of weed seed data at a first moment in time while outputting second different control signals in response to a second set of weed seed data at a second point in time. For example, the control signals may actuate the working member between an off state and an on state based upon the data. The control signals may actuate or adjust the working member from a first on state to a second on state different than the first on state. The control signals may cause an actuator to adjust the positioning of one or more grain flow valve mechanisms, baffles of the like to direct the crop flow and its weed seed through different screens of the working member based on the data. The control signals may just the speed at which an actuator or actuators are driven to adjust the conveyance of harvested material, including weed seed, along the crop path.

Figure 5:
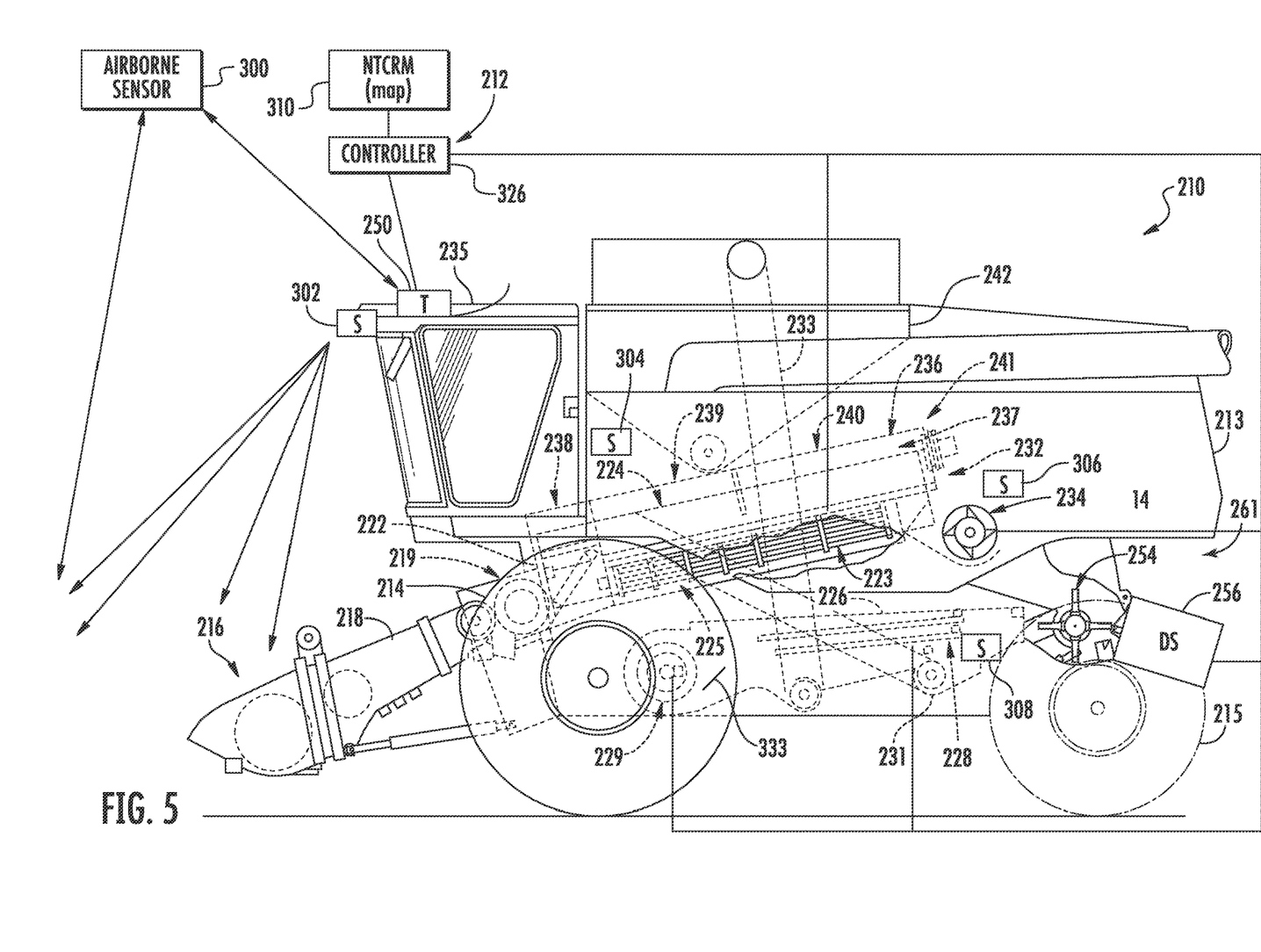
FIG. 5 is a side view illustrating an example harvester having an example weed seed control system.

FIG. 5 is a side view of an example harvester 210 including an example weed seed control system 212. In addition to weed seed control system 212, combine harvester 210 comprises a main frame 213 having wheel structure including front and rear ground engaging wheels 214 and 215 supporting the main frame for forward movement over a field of crop to be harvested. The front wheels 214 are driven by an electronically controlled hydrostatic transmission.

A vertically adjustable header or harvesting platform 216 is used for harvesting a crop and directing it to a feeder house 218. The feeder house 218 is pivotally connected to the frame 213 and includes a conveyor for conveying the harvested crop to a beater 219. The beater 219 directs the crop upwardly through an inlet transition section 222 to a rotary cleaning and separating assembly 224. In other implementations, other orientations and types of cleaning structures and other types of headers 216, such as transverse frame supporting individual row units, are utilized.

The rotary cleaning and separating assembly 224 threshes and separates the harvested crop material. Grain and crop residue, such as chaff, fall through a concave 225 and separation grates 223 on the bottom of the assembly 224 to a cleaning system 228, and are cleaned by a chaffer/sieve 226 and air fan or blower 229. The blower 229 blows the lighter crop residue above the chaffer/sieve 226 rearwardly to the weed seed devitalizer 24. The grain passes through openings, between louvers, provided by the chaffer/sieve 226. The clean grain is directed to elevator 233. Clean grain elevator 233 conveys the grain to tank 242. The clean grain in the tank 242 can be unloaded into a grain cart or truck by unloading auger. Tailings fall into the return elevator or auger 231 and are conveyed to the rotor 237 where they are threshed a second time.

Threshed and separated straw, potentially carrying weed seed, is discharged from the rotary cleaning and separating assembly 224 through an outlet 232 to a discharge beater 234. In one implementation, the discharge beater 234, in turn, propels the straw to the rotary chopper 254. In some implementations where the straw is chopped by chopper 254, discharge beater 234 may be omitted or other mechanism may be used to direct the straw to rotary chopper 254. In yet other implementations, the discharge beater 234 may direct the straw to a discharge outlet above a discharge spreader 256, wherein the straw is not chopped by spreader 256 prior to being discharged from the rear of combine harvester 210. The operation of the combine is controlled from an operator's cab 235.

In the example illustrated, the rotary cleaning and separating assembly 224 comprises a cylindrical rotor housing 236 and a rotor 237 located inside the housing 236. The front part of the rotor and the rotor housing define the infeed section 738. Downstream from the infeed section 238 are the cleaning section 239, the separating section 240 and the discharge section 241. The rotor 237 in the infeed section 238 is provided with a conical rotor drum having helical infeed elements for engaging harvested crop material received from the beater 219 and inlet transition section 222.

In the cleaning section 239, the rotor 237 comprises a cylindrical rotor drum having a number of cleaning elements, sometimes called rasping bars, for cleaning the harvested crop material received from the infeed section 238. Downstream from the cleaning section 239 is the separating section 240 wherein the grain trapped in the threshed crop material is released and falls to the cleaning system 228.

In addition to receiving harvested material from discharge beater 234, chopper 254 may also receive harvested material blown by blower 229. Chopper 254 chops the received harvested material to a finer or smaller consistency for spreading by discharge spreader 256.

Discharge spreader 256 propels and distributes the harvested material, potentially including weed seeds, out of harvester 210, to the growing medium. In one implementation, discharge spreader 256 comprises a rotary actuator which rotationally drives blades that propel the harvested material being discharged. In some implementations, discharge spreader 256 may be rotationally driven so as to impact weed seed with sufficient force so as to damage the weed seeds to devitalize the weed seeds, inhibiting further germination of the weed seeds.

Weed seed control system 212 comprises working members that interact with weed seeds moving along the crop path and a controller 326 that adjusts the settings or operations of the working members based upon data regarding our indicating forthcoming weed seeds. Examples of the working members that are utilized by weed seed control system 212 include, but are not limited to, components of rotary cleaning and separating assembly 224, components of cleaning system 228, blower 229, chopper 254 and discharge spreader 256. Each of such working members may include rotary and/or linear actuators in the form of hydraulic motors, electric motors, electric solenoids, or transmissions driven by the internal combustion engine of harvester 210, wherein the actuators linearly are rotationally drive members that interact with the harvested material or that move various members relative to one another to adjust the spacing or gap between such members through which harvested material passes or is filtered or is guided. In other implementations, we'd see control system 212 may comprise additional or fewer of working members that interact with harvested material that may comprise weed seeds.

Controller 326 may be similar to controller 26 shown in FIG. 2 or controller 126 shown in FIG. 3. Controller 326 adjust the operational parameters of the working members based upon data indicating forthcoming weed seeds, including both the presence of weed seeds, as well as the characteristics of the forthcoming weed seeds. In the example illustrated, system 212 comprises various sources of such weed seed data. As shown by FIG. 5, system 212 may additionally comprise airborne sensor 300, forward sensor 302, internal sensors 304, 306 and 308, and weed map 310.

Airborne sensor 300 senses weed or weed seed characteristics in regions of a field just in front of harvester 210 prior to harvester 210 severing the crops from the growing medium of the field. Airborne sensor 300 may detect such parameters such as weed density, weed health, weed type and the like. From such information, weed types may be identified in estimates may be made with regard to the quantity of expected forthcoming weed seed. Airborne sensor 300 may communicate in a wireless fashion with a transceiver 250 carried by harvester 210, wherein transceiver 250 is in communication with controller 326, relaying data from airborne sensor 300. In some implementations, airborne sensor 300 may initially communicate with the intermediate communication element that then communicate in a wireless fashion with transceiver 250. Transceiver 250 may additionally receive geo-positional data regarding the position of harvester 210 as it traverses the field. For example, transceiver 250 may receive global positioning system data from a satellite. In one implementation, airborne sensor 300 may comprise a satellite. In another implementation, airborne sensor 300 may comprise a drone. In one implementation, transceiver 250 may output control signals controlling the position of the drone, causing the drone to track remain ahead of harvester 210 as it traverses a field, continuing to output signals to transceiver 250 and controller 326, continuing to provide weed seed data in a continuous and dynamic fashion to harvester 210 as it traverses the field.

Forward sensor 302 comprise a sensor mounted are supported proximate a front end of harvester 210. Sensor 302 is configured to sense regions in front of harvester 210 as well as to sense weeds being conveyed by portions of head 216. In one implementation, sensor 302 may comprise an optical sensor, wherein controller 26 utilizes optical recognition to distinguish between weeds and crop, to ascertain weed quantity and to distinguish between different types of weeds. In one implementation, sensor 302 may comprise a Lidar type sensor. In yet other implementations, sensor 302 may comprise other forwardly mounted sensors. The output from sensor 302, reflecting weed seed data, is transmitted to controller 26.

Internal sensors 304, 306, 308 comprise weed and/or seed detecting sensors located internally throughout various portions of the crop flow path through harvester 210. Such sensors may comprise infrared sensors, acoustic sensors, optical sensors or contact/vibration sensors. Sensor 304 is positioned above or proximate to separating assembly 224. Sensor 306 is located proximate to beater 234. Sensor 308 is located proximate to the sieves or chaffers of cleaning system 228. In other implementations, sensor 304, 306 and 308 may be provided at other locations along the general crop flow path through harvester 210. In yet other implementations, additional or fewer of such weed seed sensing or detecting sensors may be provided as part of harvester 210.

In one implementation, the data collected by sensors 300, 302, 304, 306 and 308 may be stored by controller 326. In one implementation, the stored data regarding weed seeds may be geo-referenced using geographic data received by controller 326. For example, controller 326 may receive geo-data from an airborne satellite system, such as a global positioning system, as it traverses a field, wherein the weed seed data from the various sensors is geo-referenced by linking the current received data to the current geo-data. The geo-link weed seed data may then be stored in a non-transitory computer-readable medium or may be used to update or modify map 310 for subsequent use when harvesting the same regions of a field during subsequent harvesting seasons.

Weed map 310 comprises a historical digital map mapping weed to density and type two different regions of the field in which harvester 210 is harvesting a crop. In one implementation, map 310 may be formulated using data acquired from sensors 300, 302, 304 and 308 as described above. In some implementations, map 310 may have been previously formulated using data from an airborne sensor, such as a satellite a drone, which acquired such data prior to harvest, such as during the growing season for the crop. Map 310 may be formulated using data from an airborne sensor just prior to harvest. In some implementations, map 310 may be formulated using data acquired by other passes of other equipment across the field in the same growing season. For example, data may be acquired by a sprayer as it traverses a field prior to the harvesting of the crops later in the growing season. In some implementations, map 310 may additionally or alternatively comprise such mapped weed information from prior growing seasons or harvesting operations. In one implementation, map 310 may be provided in a non-transitory computer-readable medium (NTCRM) carried by harvester 210. In some implementations, weed map 310 may be formulated based upon a combination of data received from multiple sources, for example, data acquired during a prior growing season, Dean acquired from other equipment or sensors earlier in the growing season, airborne sensors and the like. In some implementations, the different data from the different sources used to formulate map 310 may be differently weighted based upon predefined weightings or user selected weightings. In some implementations, the data of map 310 may be communicated to harvester 210, to transceiver 250, in a wireless fashion from a remote database or remote data source.

Controller 326 may utilize data from any, all or a subcombination of sensor 300, sensor 304, 306, 308 and map 310 when generating control signals for adjusting the operational state or operational parameters of the different working members. In some implementations, different weighting factors may be applied to the different data sources based upon empirically determined importance of the different data sources. For example, data from sensor 308 or 306, in close proximity to a particular, may be given a greater importance or greater weighting as compared to data received from sensor 304, more distant to the particular working member when determining and generating control signals that control and actuator actuators to adjust the operation of the particular working member. Data received from forward sensor 302 may be given a lower weighting as compared to internal sensors 304, 306, 308. Data from airborne sensor 300 may be given a weight similar to sensor 302 or a lesser weight. In one implementation, data from map 310 may be given the lowest weighting due to its historical nature. In yet other implementations, other weighting schemes may be applied to the data from the different data sources by controller 26 when generating control signals for adjusting the operational parameters of the individual working members.

In the example illustrated, harvester 210 forms a crop path along which harvested material including grain, biomass material and weed seeds travel following initial separation from the growing medium and during threshing of the harvested material by harvester 210. The crop path may begin at a header or harvesting platform 216 where material is separated from the growing medium. The crop path may continue to where the crop material is interacted by working member in the form of a rotor of rotary cleaning and separating assembly 224. Smaller grain and weed seed as well as smaller harvested material may pass through the grates associated with the rotor along the path towards working member in the form of cleaning system 228. In one implementation or mode of operation, controller 326 may output control signals based upon weed seed data 28-1 and/or 28-2 (described above) that adjust the operation of assembly 224, such as the spacing between the concave or grate and the rotor.

The harvested material that passes through the filtering of working assembly 224 is further filtered by cleaning system 228. Based upon the weed seed data 28-1 and/or 28-2, controller 126 may output control signals adjusting the state or operation of cleaning system 228. For example, the spacing of the louvers of the sieve/chafer may be adjusted or the rate of reciprocation of the sieve or chafer of cleaning system 228 may be adjusted based upon the weed seed data.

Blower 229 generates airflow which is directed through and across the sieve or chafer of cleaning system 228. Based upon weed seed data 28-1 and/or 28-2 as described above, controller 126 may output control signals to the rotary actuator, adjusting the rate at which blower 229 is driven by rotary actuator or other actuators that adjust air directing baffles 333. The air driven through and across the louvers of sieve/chafer of cleaning system 228 lift and carry lighter harvested material, such as chaff and weed seed, towards a working member in the form of a discharge spreader 256.

In one mode of operation, the blower 229 (including its rotary actuator and any air directing baffle 333) may be adjusted so as to be less likely to blow the generally lighter weed seeds towards discharge spreader 256, so as to increase the amount of weed seed that is actually captured and harvested to reduce the amount of weed seed that is discharged to the field, wherein the weeds are to be subsequently filtered out at a later grain cleaning operation. Conversely, in another operator selected mode of operation, the operation of the blower 229 and/or baffles 333 (schematically illustrated) may be adjusted such that the generated airflow is stronger or more direct so as to carry a greater amount of weed seed to the end of the crop path for discharge, reducing foreign material in the grain and enhancing grain quality.

Harvested material that does not pass through the concave or grate of assembly 224 may further be directed to a working member in the form of a chopper 254 driven by rotary actuator, such as a rotary actuator 138 schematically illustrated in FIG. 3. In one implementation, the controller 326 outputs control signals, based upon weed seed data 28-1 and/or 28-2 (as described above) to the rotary actuator to adjust the velocity of the chopper 254 and/or the degree to which the biomass or crop material is chopped or pulverized. In one mode of operation, the chopper 254 may be adjusted so as to more finely chop the biomass, increasing likelihood that the weed seed will be damaged. Conversely, in another mode of operation, the operation of the chopper 254 may be adjusted such that the biomass including the weed seed is chopped to a lesser extent such that the weed seed will be discharged across a smaller area by a discharge spreader, reducing the extent of weed growth and subsequent growing seasons.

Harvested material which is not conveyed to a grain tank or other storage of harvester 210 is directed along the crop path to a working member in the form of a discharge spreader 256 that may be driven by a rotary actuator such as rotary actuator 142 (schematically shown in FIG. 3). In one implementation, the control signals may adjust operation of the discharge spreader 256, such as adjusting the velocity of the rotary actuator driving the discharge spreader and/or the degree to which the discharge spreader 256 impacts the biomass. In one mode of operation, the operation of the discharge spreader 256 may be adjusted so as to impact the weed seed at a greater velocity, increasing likelihood that the weed seed will be damaged. Conversely, in another mode of operation, the operation of the discharge spreader 256 (its rotary actuator) may be adjusted such that the biomass including the weed seed is spread to a lesser extent such that the weed seed will be discharged across a smaller area by a discharge spreader, reducing the extent of weed growth and subsequent growing seasons.

In one implementation, controller 326 records and stores the settings of the various working machines and/or the adjustments made to the working machines (settings and/or adjustments being collectively referred to as working machine parameters) in response to the weed seed data. In one implementation, controller 326 receives geo-referencing data and correlates or associates the working machine settings and/or adjustments to the physical locations in the field during which the different working machines were operating at the working machine settings or the times and locations at which the adjustments to the working machines based upon weed seed data were implemented.

For example, in one implementation, controller 326 may record in a non-transitory computer-readable medium or communicate to a recording device remote from harvester, the power, the speed or torque applied to the discharge spreader 256 and their corresponding different geo-referenced locations across a field, which may correlate to the degree of spread of weed seed at the particular geo-referenced locations across the field. In one implementation, controller 326 may determine or estimate the spread of weed seed based upon the recorded velocity or settings for the discharge spreader 256 and the weight, moisture or other parameters of the detected weed seed, wherein the determined or estimated spread of the weed seed at each geo-referenced location is recorded or stored. This recorded data regarding the spread of the weed seeds may then be utilized to control future applications of tillage or herbicide spraying to different geo-referenced locations across the field based upon the varying weed seed spread.

In some implementations, harvester 210 may additionally include a sensor 261 (schematically shown), such as a camera, LIDAR sensor or other device that directly detects the degree of spread of the biomass discharge, including the weed seed. The sensor 261 may be focused on the rear of harvester 210 where the biomass is discharged. The data output by the sensor 261 may be utilized in combination with the weed seed data and/or other values such as the settings or adjustments that were made to discharge spreader 256 to map different weed seed spread or disbursement distributions or populations across different geo-referenced regions of a field, wherein the mapped weed seed spread distributions or populations may be utilized for future applications of tillage or spraying to the different regions of the field.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A harvester comprising:
   a crop path along which crops are moved;
   a working member to interact with weed seeds moving along the crop path, the working member being selected from a group of working members consisting of: a blower; a discharge spreader; a sieve; a chaffer; and a chopper; and
   a controller to receive data indicating forthcoming weed seeds and to output control signals controlling the working member based on and automatically in response to the data.

2. The harvester of claim 1, wherein the data indicates presence of weeds supporting the weed seeds in front of the harvester.

3. The harvester of claim 1, wherein the data indicates presence of weed seeds being conveyed by the harvester.

4. The harvester of claim 1, wherein the working member comprises the blower.

5. The harvester of claim 4, wherein the controller is to increase an output of the blower in response to the data indicating an increase in forthcoming weed seeds to reduce weed seeds in clean grain.

6. The harvester of claim 4, the controller is to decrease an output of the blower in response to the data indicating an increase in forthcoming weed seeds to reduce discharge of weed seeds from the harvester.

7. The harvester of claim 1, wherein the working member comprises the discharge spreader and wherein the controller is to reduce a discharge spread of the spreader in response to the data indicating an increase in forthcoming weed seeds.

8. The harvester of claim 1, wherein the working member comprises the chopper to chop crop material to adjust how discharged weed seeds will till into soil.

9. The harvester of claim 1, wherein the working member comprises the sieve or chaffer having louvers and wherein the controller is to adjust a spacing of the louvers or a reciprocation parameter of the sieve or chaffer based upon the data.

10. The harvester of claim 1 further comprising a sensor carried by the harvester to output the data.

11. The harvester of claim 1 wherein the data comprises pre-harvest data stored on a non-transitory computer-readable medium.

12. The harvester of claim 1 further comprising a receiver to wirelessly receive the data originating from an air-borne sensor.

13. The harvester of claim 1 further comprising a sensor within an interior of the harvester to sense weed seeds being conveyed within the interior of the harvester.

14. The harvester of claim 1, wherein the controller is to output control signals controlling the working member based on and automatically in response to a combination of the data and second data indicating characteristics of the crops being moved along the crop path.

15. The harvester of claim 14, wherein the characteristics of the crops being moved along the crop path are selected from a group of characteristics consisting of: current yield rate and current moisture content.

16. The harvester of claim 1, wherein the controller is to output control signals controlling the working member based on and automatically in response to a combination of the data and second data indicating a pitch or a roll of the harvester.

17. A harvester comprising:
- a crop path along which crops are moved;
- a working member to interact with weed seeds moving along the crop path; and
- a controller to receive data indicating a parameter of forthcoming weed seeds and to output control signals controlling the working member based on and automatically in response to the data, the parameter being selected from a group of parameters consisting of: weed seed size, weed seed weight, weed seed density; and weed seed type.

18. The harvester of claim 17, wherein the controller is configured to output the control signals automatically based upon and in response to a combination of different weed seed parameters.

19. The harvester of claim 18, wherein the different weed seed parameters are differently weighted.

20. A non-transitory computer-readable medium comprising instructions to direct a processing unit, the instructions comprising:
- data acquisition instructions to direct the processing unit to obtain data indicating forthcoming weed seeds; and
- working member instructions to direct the processing unit to output control signals to control operation of a working member that interacts with weed seeds moving along a crop path of a harvester based upon the data, wherein the instructions are to direct the processing unit to associate different working member parameters with different geo-referenced regions, and to store the associated working member parameters with their associated geo-referenced regions.

* * * * *